(12) United States Patent
Gerst (10) Patent No.: US 10,456,843 B2
(45) Date of Patent: Oct. 29, 2019

(54) VIBRATING CUTTER TOOL CIRCULAR CUTTING JIG

(71) Applicant: Gerald A Gerst, Bantam, CT (US)

(72) Inventor: Gerald A Gerst, Bantam, CT (US)

( * ) Notice: Subject to any disclaimer, the term of this patent is extended or adjusted under 35 U.S.C. 154(b) by 215 days.

(21) Appl. No.: 15/692,305

(22) Filed: Aug. 31, 2017

(65) Prior Publication Data
US 2018/0065189 A1  Mar. 8, 2018

Related U.S. Application Data

(60) Provisional application No. 62/382,830, filed on Sep. 2, 2016.

(51) Int. Cl.
| B23B 47/28 | (2006.01) |
| B23D 45/02 | (2006.01) |
| B23B 51/05 | (2006.01) |
| B26F 1/38  | (2006.01) |
| B03B 5/24  | (2006.01) |
| B23Q 9/00  | (2006.01) |
| B27B 19/00 | (2006.01) |

(52) U.S. Cl.
CPC .......... B23B 47/281 (2013.01); B23B 51/05 (2013.01); B23D 45/025 (2013.01); B26F 1/3846 (2013.01); B03B 5/24 (2013.01); B23Q 9/0078 (2013.01); B27B 19/006 (2013.01)

(58) Field of Classification Search
CPC ....... B03B 5/24; B26F 1/3846; B27B 19/006; B23B 47/281; B23B 51/05; B23D 45/025; B23Q 9/0078

USPC ....................................................... 33/27.031
See application file for complete search history.

(56) References Cited

U.S. PATENT DOCUMENTS

| 5,044,238 A * | 9/1991 | Etcheparre ............... B26D 9/00 451/423 |
| 5,271,301 A * | 12/1993 | Hiraoka ................. B23B 29/125 407/6 |
| 2002/0152851 A1* | 10/2002 | Moriwaki ............... B23B 25/02 82/1.11 |
| 2007/0180961 A1* | 8/2007 | Imai ...................... B23B 29/125 82/1.5 |
| 2007/0233131 A1* | 10/2007 | Song .................. A61B 17/1671 606/79 |
| 2012/0181730 A1* | 7/2012 | Edwards ................. B23B 47/34 264/442 |
| 2018/0065189 A1* | 3/2018 | Gerst ...................... B23B 51/05 |

* cited by examiner

*Primary Examiner* — Yaritza Guadalupe-McCall
(74) *Attorney, Agent, or Firm* — Gregory Stauf (57) ABSTRACT

A circular jig apparatus to allow cutting or marking of large circular holes in sheets of material using a tool with a cutting blade or marking device is disclosed. This apparatus includes a system to hold the hold the tool in place, adjust the size or radius of the circular hole, and guide the cutting blade or marking device around in a circle on the sheet of material. In particular the cutting tool may be a vibrating blade. A system is also disclosed to match the curvature of the cutting blade to the arc or radius of the circle being cut. A system is also disclosed to provide a depth stop for the cutting blade. A system to hold a wide variety of marking or dispensing devices for use with the circular jig is also disclosed.

24 Claims, 6 Drawing Sheets

VIBRATING CUTTER TOOL CIRCULAR CUTTING JIG

CROSS REFERENCE TO RELATED APPLICATIONS

U.S. Provisional Application 62/382,830, filed Sep. 2, 2016

BACKGROUND OF THE INVENTION

REFERENCES

N/A

The invention described herein relates generally to an apparatus which provides a convenient way to cut circular holes of different diameters in a wide variety of materials.

SUMMARY DISCLOSURE OF INVENTION

The invention described herein relates generally to an apparatus which provides a jig or guide for circular hole cutting with a vibrating cutting tool, allowing it to quickly and easily cut circular holes in a variety of materials. The circular holes can be of a wide range of diameters, with a relatively small set of jigs or guides, based on adjustments of the jigs or guides, allowing it to be used for a variety of holes, such as for speakers, ducts, and lighting fixtures. Because of use of the vibrating blade, or "vibro" cutting tool, there is minimal damage to finished surfaces, allowing it to be used where there are only small covering sections or trim plates to hide hole edges. The guide also allows for convenient one-handed operation when a surface is fixed in place, and generates minimal dust compared to most types of saws. Finally, it allows large, uniform holes to be cut in sheets of materials where there is inadequate space to use a conventional hole saw or jig saw.

One embodiment of this invention lets it cut circular holes ranging from 2" to 14" in diameter, by making several adjustments on the guide. Other embodiments include systems for holding a variety of cutting, piercing and marking implements to cut, pierce or mark sheets of material.

MODE(S) FOR CARRYING OUT THE INVENTION—DETAILED DESCRIPTION

The present invention and its various embodiments are described below, with reference to figures as necessary. Reference numbers are used to match particular elements described in the text with those shown in figures. Although the embodiments disclosed will be described with reference to the embodiments shown in the drawings, it should be understood that the embodiments disclosed can be embodied in many alternate forms of embodiments. In addition, any suitable size, shape or type of elements or materials could be used.

In particular, while this invention may be discussed in relation to its use with a vibrating blade cutting tool, it could clearly be used with a variety of cutting tools which may have flexible or thin cutting blades, such as, but not limited to, certain types of reciprocating saws.

Figure 1:
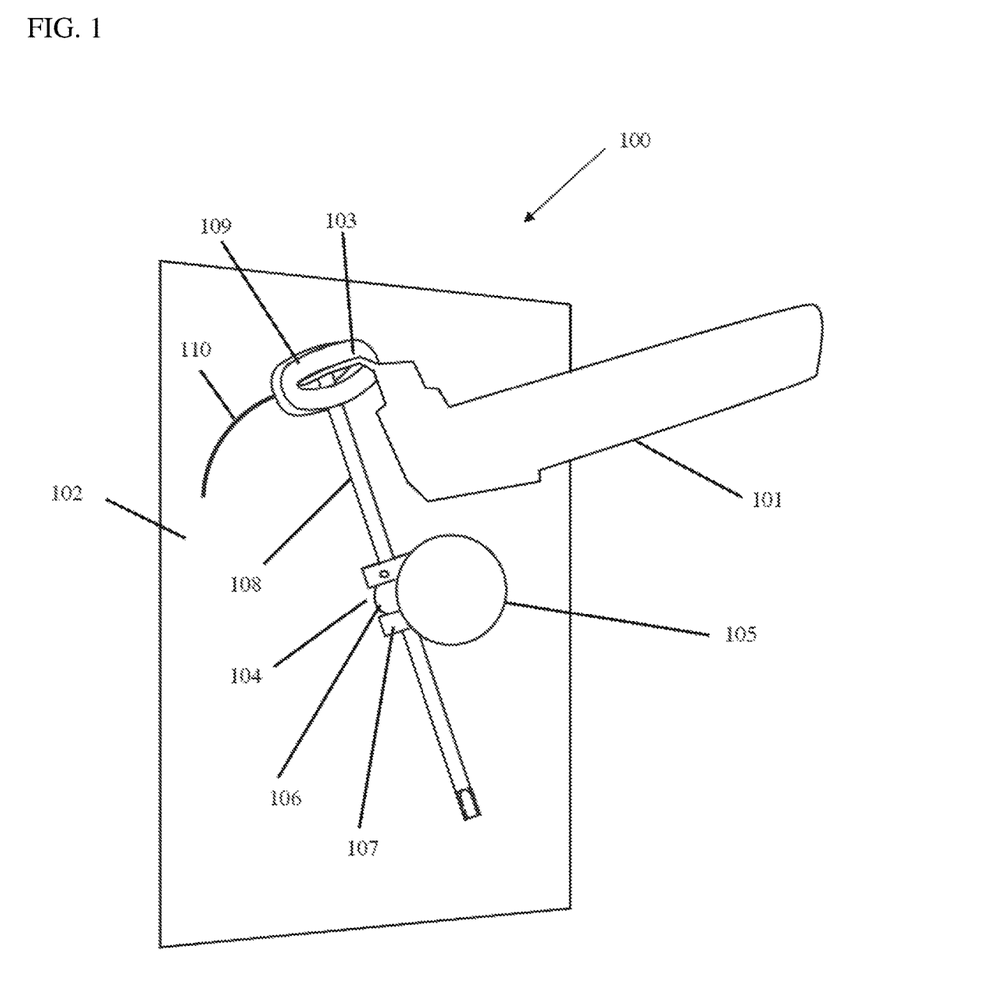
FIG. 1 shows a diagram of the circular hole cutting guide in use with a cutting blade on a sheet of material.

FIG. 1 shows a diagram of the vibrating blade cutting tool guide 100 in use. Vibrating tool 101, such as, but not limited to, a Fein Multimaster, is normally used to cut relatively soft flat, sheet-like materials such as wood, plastic, fiberboard, and so on 102 using vibrating blade 103. In some cases it may be desirable to cut a specific sized hole in the flat sheets for things such as ducts, sink basins, speakers, lighting fixtures, and so on. In this embodiment of the invention, a center hole 104 is made (under the spherical gripper 105 shown), and a pivot post 106 (also under the spherical gripper 105) placed into the hole 104. Note that other methods of attaching the pivot post 106 could be used, such as, but not limited to, clamping from above or below, magnets, a suction cup, or screwing the pivot post down. This may be particularly helpful if the circular hole cutting guide is being used to cut a hole in a material where the cut out disk is the desired final product, so should not be damaged. A suction cup would work particularly well for attaching the pivot post 106 to flat materials like plexiglass or glass. Also note that it is not required that this center hole 104 be drilled all the way through the sheet, a blind hole with a small screw could be used, making it easier to plug or fill the hole later. Also note that while the gripper 105 is described as spherical, it could have a variety of shapes for convenient gripping, such as, but not limited to, a knurled knob, an oval, or a bar, or could be minimized in size to make a smaller tool. The pivot post 106 could comprise a variety of materials and devices, such as a threaded metal bolt, a drill bit, a plastic or wooden peg, a magnetic device, and so on, it merely acts as a center pivot for slider bracket 107 which is used to allow length adjustment of a sliding arm, slider 108, so that blade holder 109 can be placed at different radii from the original hole 104, thus allowing holes of different radii to be cut in sheet 102. This adjustable sliding arm or slider 108 can be made of a variety of materials, including but not limited to plastic, metal, wood, wire, chain, metal tape or string, and in particular may be rigid or flexible. In a particular embodiment of this invention, guide marks on the slider 108 can be used to set different hole radiuses as slider 108 is slid back and forth in slider bracket 107. A variety of systems can be used to hold slider 108 in place in slider bracket 107 such as, but not limited to, clamps, set screws, and springs. These can be combined with foam, rubber, silicone or other "grippy" materials to help hold the slider in place. A spring retraction system such as tape measures use may also be employed to pull the slider 108 back to the either the slider bracket 107 or blade holder 109, particularly if the slider is flexible such as wire, chain, metal tape or string. The beginning arc 110 of a hole being cut in sheet 102 can be seen in FIG. 1.

Note that in this case while the body 101 of the vibrating blade cutting tool is shown extending out parallel to the blade 103, perpendicular to sheet 102, in some models of these tools the body 101 can be rotated 90 degrees relative to the blade 103 where the blade attaches to the body of the tool such that the body 101 of the tool would be roughly parallel to the sheet of material 102. This would allow hole 110 to be cut in the sheet of material 102 with very limited accessible clearance above the sheet of material 102, as little as a few inches, showing one of the advantages of this invention relative to things like conventional hole saws or jig saws, which would require much more clearance above the sheet of material 102. It is also apparent that in such an application, where the sheet of material was fixed in place, the invention could be used to cut a hole with just one hand needed to guide it, though another hand could also be used on gripper 105 if needed.

Figure 2:
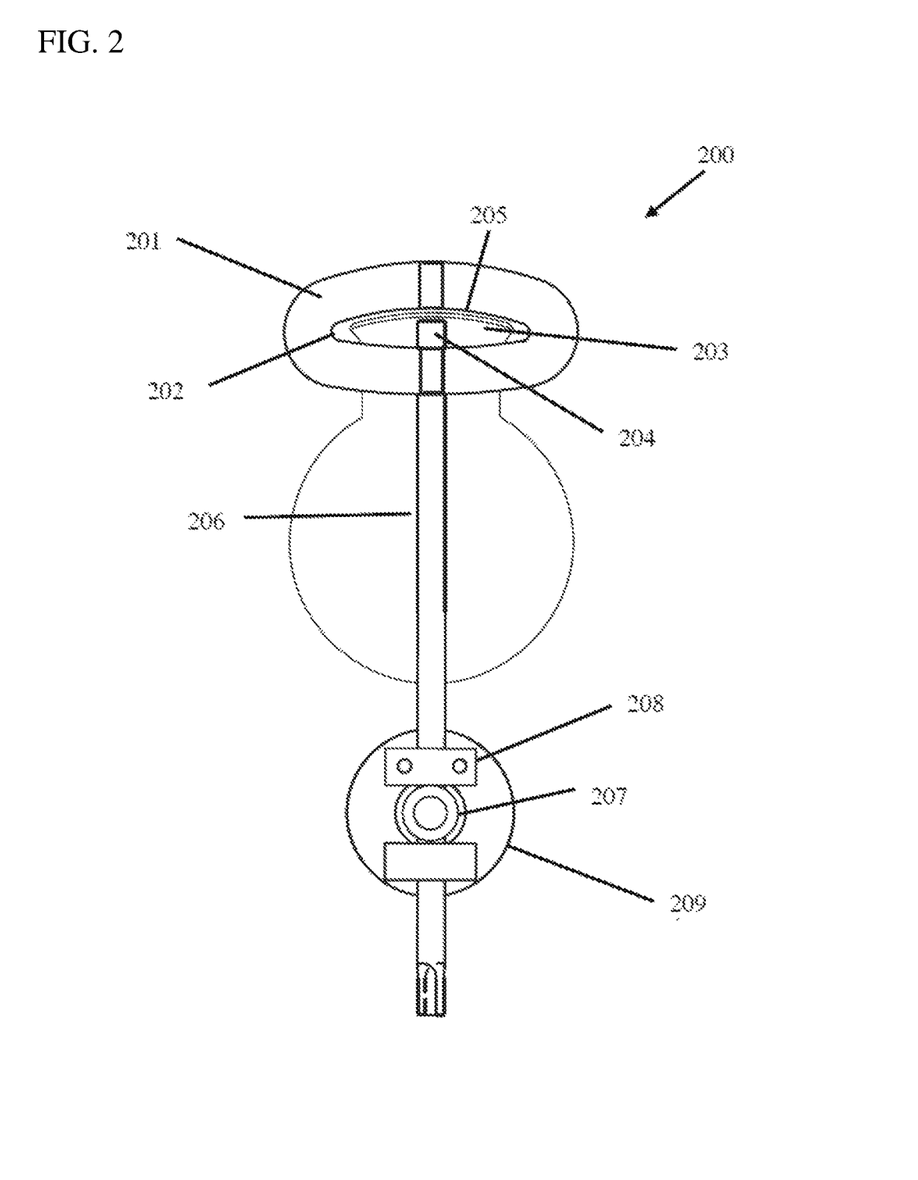
FIG. 2 shows a close up diagram of the underside of the circular hole cutting guide.

FIG. 2 shows a diagram of a close up of the underside of the vibrating blade cutting tool guide 200. Blade holder 201 has an elongated slot 202 cut in it and passing through the body of the blade holder, of a suitable size to hold vibrating cutting blade, 203. The long direction of this slot is approximately perpendicular to the direction in which the slider can be adjusted, and is parallel to the direction of the flat of the vibrating blade. Note the slight curvature in blade 203, this is because there is a rod 204 pressing thin, flexible blade 203 against the curved interior side 205 of the elongated slot 202 of blade holder 201, thereby causing the blade 203 to take on a shallow arc approximately matching the arc needed for a large hole 110 being cut in a sheet of material 102. Matching the curve of the slot 202 with the arc of the large hole provides a smaller cut line and cleaner edge than would be the case if a flat blade 203 were merely being maneuvered in a circle, for example by following a traced line on the surface of the sheet of material without the apparatus of this invention. In this embodiment rod 204 is the same as the slider 206 or 108 (FIG. 1) but in an alternative embodiment rod 204 could be a separate set screw set into blade holder 201. Other ways and locations of having access to the set screw or rod 204 are intended to be covered by this disclosure. Other systems of holding the blade 203 into the blade holder 201, such as, but not limited to, clamps, springs and pegs are also intended to be covered by this disclosure. Blade holder 201 is fastened to slider 206, which is used to adjust the radius at which blade 203 is positioned from center hole 104 (FIG. 1) and thereby the radius of the hole 110 which is cut in the sheet of material 102 (FIG. 1). Pivot post 207, slider bracket 208 and spherical gripper 209 are also shown in this diagram.

In another embodiment of this invention, if the cutting blade 203 is not wide and flexible enough to be bent, but rather narrow and stiff, the rod 204 could still hold the blade 203 into a slot and the blade holder 201 could still be used to guide the cutting blade in a large circle to cut out a circular hole in a sheet of material. Because the blade is narrow in such an embodiment, it is not as critical to bend the blade in an arc as described in the previous embodiment.

In another embodiment of this invention, the blade holder 201 could be used as a stand-alone device attached to the cutting blade 203, attaching the blade 203 with a specific amount protruding through the slot 202 so that the blade holder 201 can be used as a depth stop for the cutting blade 203. In this way the blade can cut any shape in a sheet of material without penetrating beyond a desired distance in the sheet of material. This would allow a groove to be cut in the sheet of material without cutting all the way through the sheet of material, if the blade protrusion is set to less than the thickness of the sheet of material. Such grooves could be used for decorative effects, or guide marks, or scribe lines for later "snapping" of the sheet of material. It would also allow cutting all the way through the sheet of material if the blade 203 protrusion is set to more than the thickness of the sheet of material, but prevent the cutting blade 203 from penetrating too far past the sheet of material on the far side of the sheet of material. This can be desirable if, for example, there are wires or plumbing behind a sheet of wallboard and the user of the tool does not want to accidently cut into them.

In another embodiment of this invention, it would also be possible to insert a cutting or marking item other than the vibrating blade cutting tool into the slot 202. Examples could include a pen or pencil for marking a surface in a circle. Other examples could include a utility knife for cutting a circle in a soft material such as wallboard or ceiling tiles. More examples of this are discussed later.

Blade holder 201, in this embodiment, is made of soft plastic, such as, but not limited to, polyethelene or Teflon. A variety of materials can be used, from soft to hard, like aluminum or stainless steel, since the rod 204 holds the vibrating blade 203 against the blade holder 201, causing the blade and blade holder to vibrate together and thereby preventing the blade 203 from cutting through the blade holder. In another preferred embodiment the blade holder 201 is made of a metal such as, but not limited to, aluminum, which is hard enough not to wear away during use. In another embodiment the blade holder 201 could be made of a resin composite. It may also be desirable to chamfer or round the lower corners, e.g. the corners facing the sheet of material 102 (FIG. 1) in particular of the blade holder 201 in order to prevent sharp bottom corners of the blade holder 201 from vibrating against and/or scuffing the surface of the sheet of material 102 (FIG. 1). It may also be desirable to form the blade holder 201 in a convex shape, upwardly curved towards its edges, on at least its lower horizontal surface to prevent the edges or corners of the blade holder 201 from vibrating against and/or scuffing the surface of the sheet of material 102 (FIG. 1).

Some types of reciprocating type saw blades could also be used, providing they do not reciprocate up and down so much that they bang the blade holder against the material sheet 102 (FIG. 1) unacceptably, given that the blade is fixed to the blade holder 201 by the rod 204 in this embodiment of the invention. In some embodiments this invention is intended to cover such other types of cutting blades.

Figure 3:
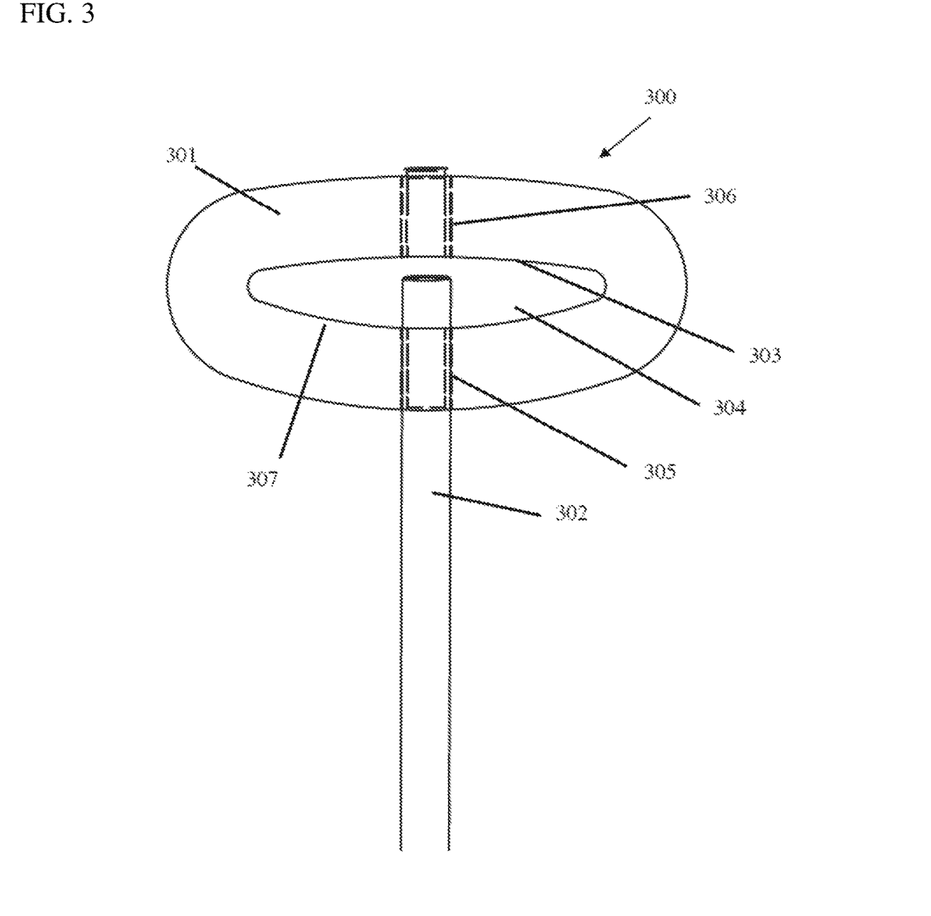
FIG. 3 shows a diagram of the vibrating blade holding part of the circular hole cutting guide.

FIG. 3 shows another embodiment of the invention 300, in particular the blade holder 301. In an embodiment of the invention, a coupling nut would be used between slider 302 (also 209 in FIG. 2 or 107 in FIG. 1) and a rod or screw 302 which serves the purpose of rod 204 in FIG. 2. In an embodiment of the invention, the screw 302 would press a thin blade such as a vibrating blade 203 in FIG. 2 against the curved side 303 of an interior slot 304 of blade holder 301. The particular side 303 shown here has a radius of curvature corresponding to a 4" hole which would be cut in a sheet of material. Thus, when the slider would be adjusted to a 4" distance from a center hole such as 104 from FIG. 1, and the screw 302 is screwed into threaded hole 305 in blade holder 301 and the vibrating blade was held down by the screw 302, the vibrating blade would be held at a curvature which would exactly match that needed to trace a 4" radius or 8" diameter hole in the sheet of material.

Conversely, if screw 303 was moved from threaded hole 305 in blade holder 301 to threaded hole 306 on the other side of blade holder 301, it would press a vibrating blade against the other side 307 of the slot 304 in blade holder 301. The other side 307 of the slot 304 has a different and sharper radius of curvature, 2" in this embodiment. Thus, by flipping or reversing the blade holder 302 on the end of the adjustable arm 302 (108 in FIG. 1 or 206 in FIG. 2) a 4" radius hole could be cut in a sheet of material using the same blade holder 301 and vibrating blade. This gives a great deal of flexibility in hole sizes which can be cut in sheets of material by using a few different interchangeable blade holders, particularly since there does not need to be an exact match between the radius of curvature the vibrating blade is bent into and the radius of curvature of the hole being cut in the sheet of material, especially at larger hole sizes. Thus, using the 4" radius side 303 of the blade holder 301 would allow the slider to be adjusted to give a 5" radius hole, and a very smooth, uniform hole could still be cut in the sheet of material.

In an alternative embodiment of this invention, not shown, multiple slots 304 could be placed in the same piece of blade guide 301 (or 201 from FIG. 2) material, each with a single arced side, or a double arced side as shown by 303 and 307 in FIG. 3, depending on how the set screw or rod system was configured. This would allow a variety of hole sizes to be formed in a sheet of material using a single blade guide template.

Figure 4:
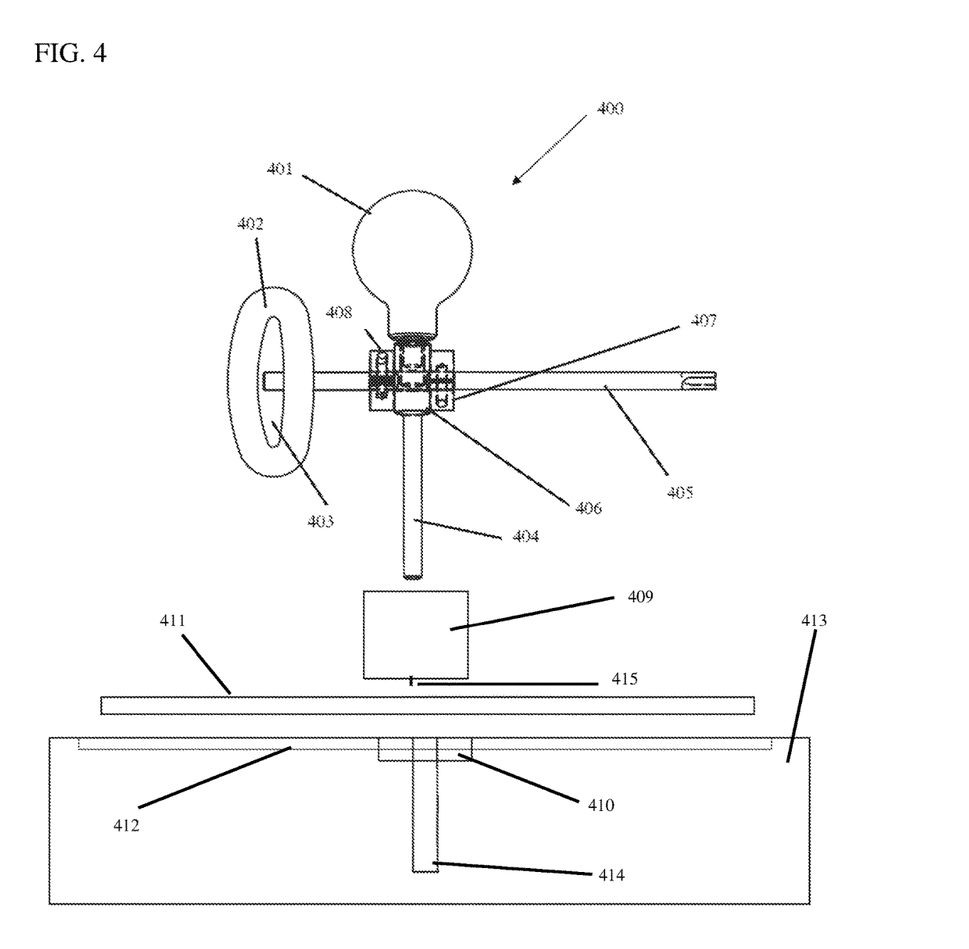
FIG. 4 shows a diagram of the circular hole cutting guide from the side.

FIG. 4 shows the circular hole cutting guide 400 in a side view. Shown are gripper 401, blade holder 402 with slot 403, pivot post 404, and slider bar 405. Slider bar 405 slides in and is adjusted to a particular hole radius using slider bracket 406. Slider bar 405 can be held in place in slider bracket 406 by a variety of methods, such as bolts 407 and 408 shown. Other methods include spring loaded clamps or a threaded hole through the entire assembly, through which rod 405 is screwed to adjust the distance between pivot post 404 and blade holder 402.

Also shown in FIG. 4 are several systems for holding the circular hole cutting guide 400 down. In one embodiment, magnets 409 and 410 hold the circular hole cutting guide 400 down, pinning sheet of material 411 to be cut or marked down against a self healing cutting mat 412 which is mounted on backing support or cutting base 413. In another embodiment, hole 414 can receive peg 404 to hold the circular hole cutting guide in place. In another embodiment, pin 415 holds the circular hole cutting guide 400 in place, with pressure from the hand on gripper 401 used to keep the circular hole cutting guide 400 from moving.

Sheet of material 411 to be cut or marked can, in any embodiment discussed, may include, but are not limited to, paper, plastic, cardboard, sheetrock, foam core board, decal sheets, linoleum, acetate, glass acrylic, polystyrene, Styrofoam, insulation, silicone, fabric, wood and metal.

Figure 5:
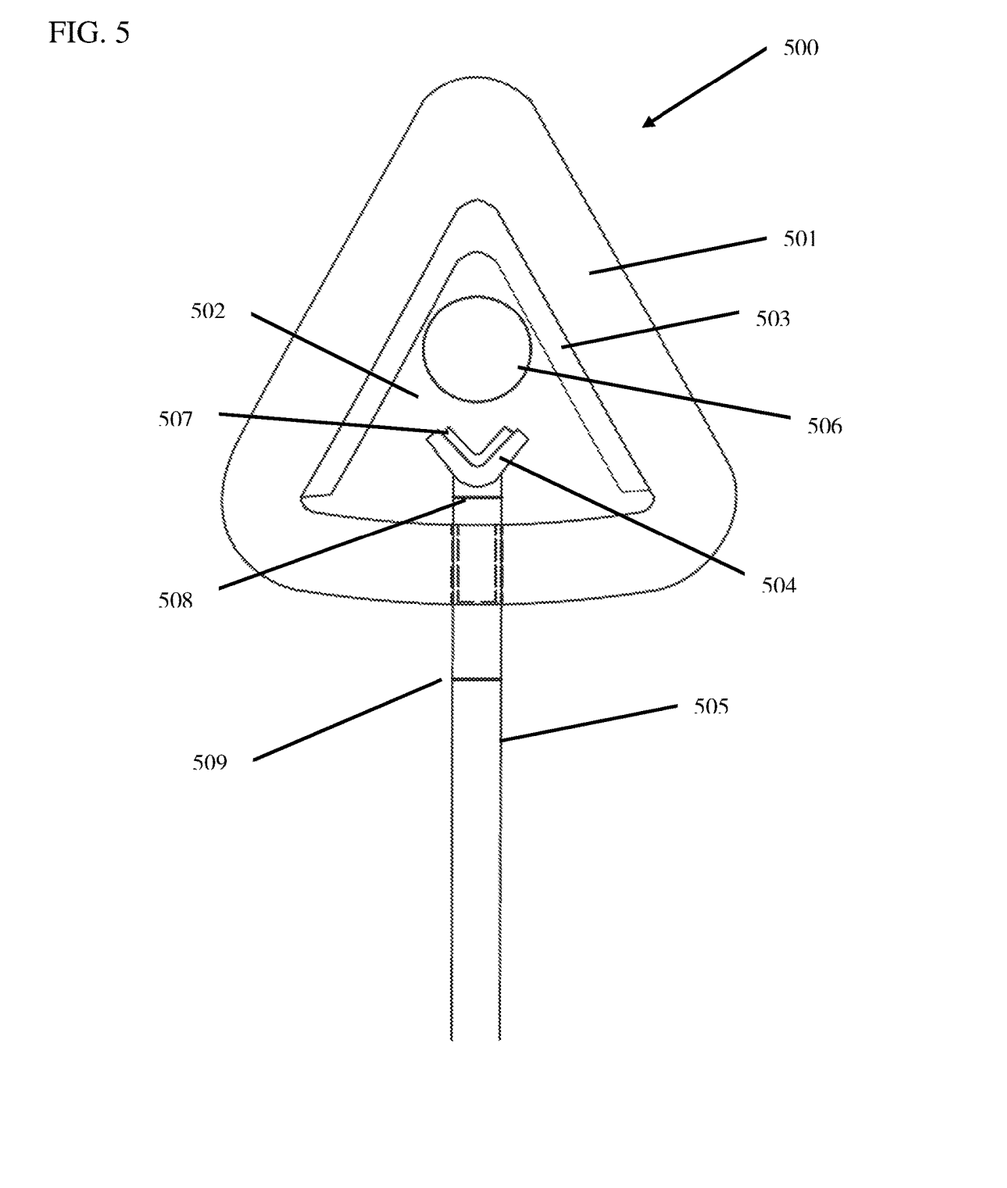
FIG. 5 shows a diagram of a generally round marking or patterning item holding embodiment of the circular hole cutting guide.

FIG. 5 shows another embodiment 500 of the "blade holder" which is adapted to hold a variety of other devices besides the vibrating cutting blade discussed earlier. Holder 501 has a central opening 502, which may have a variety of shapes but is illustrated here as approximately triangular. A gripping surface 503 which may be removable may comprise a variety of "grippy" materials such as adhesive strips, silicone rubber, and so on. A small counter pressing triangular surface 504 may be attached to the rod or screw 505 (which may be the same as, for example, 302 or 204 in previous diagrams), which may be moved forward in opening 502 as in other embodiments in order to hold cutting, piercing or marking device 506 against the interior surface of gripping surface 503 or opening 502. Counter pressing surface 504 may, like holder 501, have a gripping surface which may be removable comprising a variety of "grippy" materials such as adhesive strips, Velcro, silicone rubber, rubber, "sharkskin", and so on, or may be roughened to improve grip. Locations 508 and 509 show where attachments may be made to the rod or screw 505, either or both of these locations may include pivots to allow more versatile movement of the assembly 500.

Examples of cutting, piercing or marking device 506 include, but are not limited to, pens, pencils, charcoal, chalk, markers, an Exacto or other blade in a handle which may rotate, super glue or other glue dispensers, a hot glue gun, a dispenser with nozzle tip holding glaze, paint, dye, glue or ink, a heated device such as a wood burner, soldering iron, or heated blade tip for cutting or scoring foam core board, a pointed tip for piercing, or a glass cutting or scribing blade. Embodiment 500 of this invention is particularly suited to holding generally cylindrical shapes for cutting, piercing or marking. Any embodiment of this invention may hold such a variety of cutting, piercing or marking devices. If a liquid such as glue is being dispensed, it may act as a fastening location for application of decorative items such as glitter or fabric. The cutting, piercing or marking device 506 is generally mounted in any embodiment such that its cutting, piercing or marking tip protrudes through the opening and is approximately perpendicular to the cross section of the opening 502 so that it can cut, pierce or mark a sheet of material such as 411 in FIG. 4 or 102 in FIG. 1.

Figure 6:
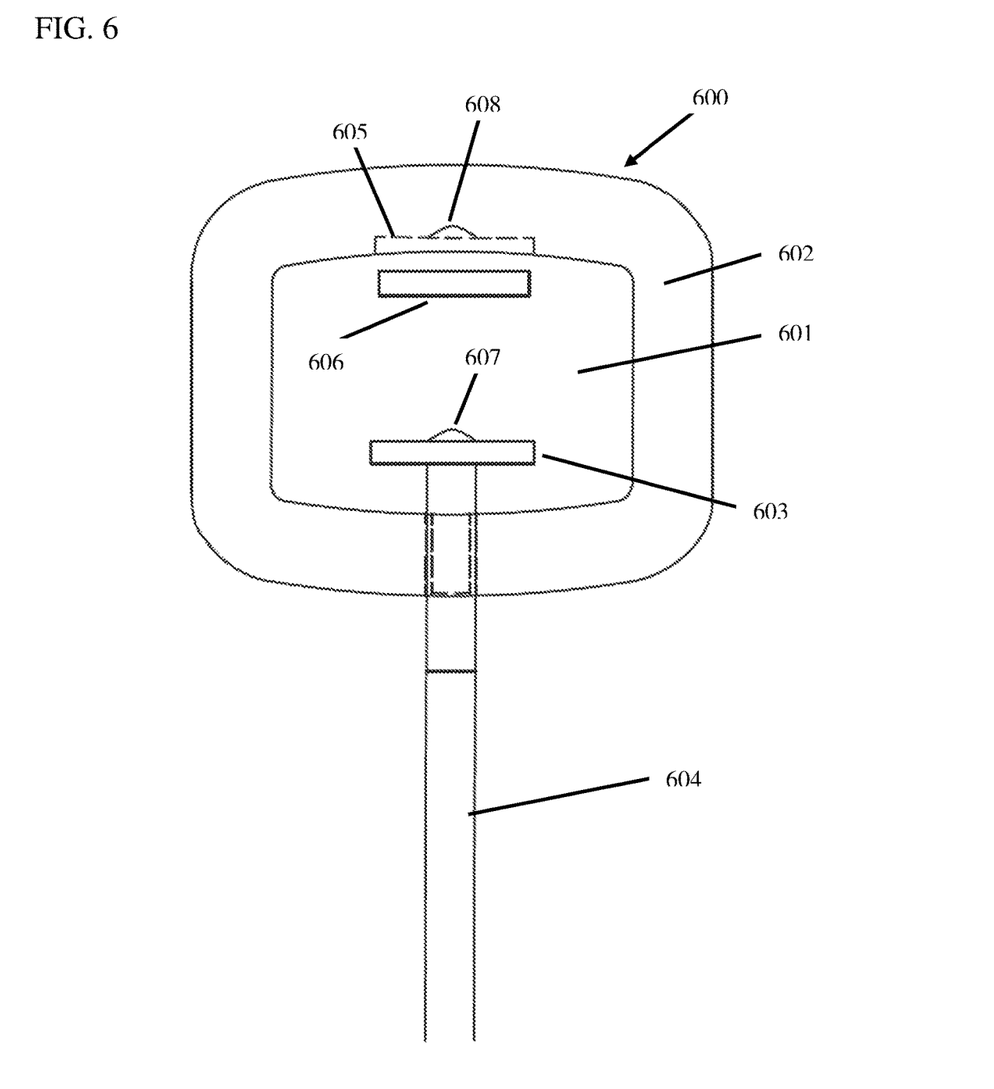
FIG. 6 shows a diagram of a generally flat marking or patterning item holding embodiment of the circular hole cutting guide.

FIG. 6 shows another embodiment 600 of the "blade holder" which is adapted to hold a variety of other devices besides the vibrating cutting blade discussed earlier. In this case the embodiment is adapted to hold cutting, piercing or marking devices which are generally flat on at least two sides. Opening 601 in holder 602 is generally rectangular, while movable surface 603 mounted to screw or rod 604 is approximately flat. In a preferred embodiment, a recess 605 sized and shaped for an Exacto style blade 606 is made in holder 602 opposite the movable surface 603, and both are shaped with corresponding pin 607 and socket 608 to fit into the hole or slot on a standard Exacto blade 606 and thereby hold the blade 606 in place in the assembly 600. As in the previous embodiment, grippy materials (not shown) may be mounted removably to the movable surface 603 and recess 605 or the opposing side of 602. Also as in the previous embodiment movable surface 604 may be detachable from or pivot on screw or rod 605.

It should be understood that the foregoing description is only illustrative of the embodiments. It should also be understood that the embodiments disclosed herein may be used individually or in any suitable combination thereof. Various alternatives and modifications can be devised by those skilled in the art without departing from the embodiments, in particular using a range of tools having a variety of cutting blade types in the apparatus. Accordingly, the present embodiments are intended to embrace all such alternatives, modifications and variances.

What is claimed is:

1. An apparatus for cutting an approximately circular large hole in a sheet of material, comprising; a cutting tool which employs a flat cutting blade, a pivot post which is attached in the center of a portion of the sheet of material which is going to be cut out, an adjustable sliding arm connected at one end to the pivot post, the adjustable sliding arm being connected at the other end to a blade holder, the blade holder having an elongated slot passing through the body of the blade holder, the long direction of the slot being approximately perpendicular to the direction in which the adjustable sliding arm can be adjusted, the blade holder having provision to fasten the cutting blade into the slot such that the flat of the cutting blade is approximately parallel to the long direction of the slot, and the pivot post allowing the blade holder with cutting blade to rotate in approximately a circle at the end of the adjustable sliding arm, thereby defining the circular portion of the sheet of material which is cut out.

2. An apparatus as described in claim 1, further comprising a curve along one long interior side of the slot, wherein the provision to fix the cutting blade into the slot also presses the cutting blade against the curve, thereby forcing a curvature of the cutting blade to approximately match the curve of the side of the slot.

3. An apparatus as described in claim 2, further comprising a curve along one long interior side of the slot, wherein the provision to fix the cutting blade into the slot presses the center of the cutting blade against the curve, thereby forcing a curvature of the cutting blade to approximately match the curve of the side of the slot.

4. An apparatus as described in claim 2, further comprising approximately matching the curve of the slot with the arc of the approximately circular large hole being cut in the sheet of material.

5. An apparatus as described in claim 2, further comprising two curvatures of the side walls of the slot on opposing long interior sides of the slot, the blade holder being reversible on the adjustable sliding arm, thereby allowing a choice of two cutting blade curvatures to match two arcs of the approximately circular large hole being cut in the sheet of material.

6. An apparatus as described in claim 1, further comprising a system for adjusting the adjustable sliding arm at the pivot post, such that the distance between the pivot post center and the location of the cutting blade can be changed.

7. An apparatus as described in claim 6, further comprising guide marks on the adjustable arm such that different radii can be set for the approximately circular large hole being cut in the sheet of material.

8. An apparatus as described in claim 1, further comprising a small center hole in the center of the portion of the sheet of material which is going to be cut out, whereby the pivot post comprises a peg in the center hole.

9. An apparatus as described in claim 1, whereby the pivot post comprises a suction cup to hold the pivot post in place in the center of the portion of the sheet of material which is going to be cut out.

10. An apparatus as described in claim 1, whereby the pivot post comprises a magnetic fastener to hold the pivot post in place in the center of the portion of the sheet of material which is going to be marked.

11. An apparatus as described in claim 1, whereby the pivot post comprises a screw to hold the pivot post in place in the center of the portion of the sheet of material which is going to be marked.

12. An apparatus as described in claim 1, wherein the cutting blade consists of a vibrating blade.

13. An apparatus as described in claim 1, wherein the blade holder portion of the apparatus can be used as a depth stop for the cutting blade, thereby controlling the depth of penetration of the cutting blade through the sheet of material.

14. An apparatus as described in claim 1, wherein the lower horizontal surface of the blade holder portion of the apparatus is convex.

15. An apparatus as described in claim 1, wherein the lower corners of the blade holder portion of the apparatus are chamfered or rounded.

16. An apparatus for marking an approximately circular section of a sheet of material, comprising; a marking tool which employs a marking device capable of marking the sheet of material, a pivot post which is attached in the center of a portion of the sheet of material which is going to be cut out, an adjustable sliding arm connected at one end to the pivot post, the adjustable sliding arm being connected at the other end to a marking device holder, the marking device holder having an opening passing through the body of the marking device holder, the marking device holder having provision to fasten the marking device into the slot such that the marking tip of the marking device is approximately perpendicular to the opening, and the pivot post allowing the marking device holder with marking device to rotate in approximately a circle at the end of the adjustable sliding arm, thereby defining the circular portion of the sheet of material which is marked.

17. An apparatus as described in claim 16, further comprising a system for adjusting the adjustable sliding arm at the pivot post, such that the distance between the pivot post center and the location of the marking device can be changed.

18. An apparatus as described in claim 17, further comprising guide marks on the adjustable arm such that different radii can be set for the approximately circular large hole being marked on the sheet of material.

19. An apparatus as described in claim 16, further comprising a small center hole in the center of the portion of the sheet of material which is going to be marked, whereby the pivot post comprises a peg in the center hole.

20. An apparatus as described in claim 16, whereby the pivot post comprises a suction cup to hold the pivot post in place in the center of the portion of the sheet of material which is going to be marked.

21. An apparatus as described in claim 16, whereby the pivot post comprises a magnetic fastener to hold the pivot post in place in the center of the portion of the sheet of material which is going to be marked.

22. An apparatus as described in claim 16, whereby the pivot post comprises a screw to hold the pivot post in place in the center of the portion of the sheet of material which is going to be marked.

23. An apparatus as described in claim 16, wherein the lower horizontal surface of the blade holder portion of the apparatus is convex.

24. An apparatus as described in claim 16, wherein the lower corners of the blade holder portion of the apparatus are chamfered or rounded.

* * * * *

UNITED STATES PATENT AND TRADEMARK OFFICE
CERTIFICATE OF CORRECTION

| | |
|---|---|
| PATENT NO. | : 10,456,843 B2 |
| APPLICATION NO. | : 15/692305 |
| DATED | : October 29, 2019 |
| INVENTOR(S) | : Gerald A. Gerst and Jaimie Caroline Gerst |

Page 1 of 1

It is certified that error appears in the above-identified patent and that said Letters Patent is hereby corrected as shown below:

On the Title Page

Item (72) Jaimie Caroline Gerst, should be added to the list of inventors.

Signed and Sealed this
First Day of December, 2020

Andrei Iancu
*Director of the United States Patent and Trademark Office*